United States Patent [19]
Matkovich

[11] Patent Number: 6,149,016
[45] Date of Patent: Nov. 21, 2000

[54] AUTOMATED SORTING APPARATUS AND SYSTEM

[75] Inventor: Mario Matkovich, Williamstown, Australia

[73] Assignee: Rosebay Terrace Pty Ltd., Australia

[21] Appl. No.: 09/068,814

[22] PCT Filed: Nov. 15, 1996

[86] PCT No.: PCT/AU96/00721

§ 371 Date: May 15, 1998

§ 102(e) Date: May 15, 1998

[87] PCT Pub. No.: WO97/18045

PCT Pub. Date: May 22, 1997

[30] Foreign Application Priority Data

Nov. 15, 1995 [AU] Australia ............................. PN 6579

[51] Int. Cl.⁷ .................................................. B07C 5/02
[52] U.S. Cl. ..................... 209/539; 209/540; 209/577; 209/587
[58] Field of Search ..................... 209/539, 540, 209/545, 559, 576, 577, 587, 939, 912, 923

[56] References Cited

U.S. PATENT DOCUMENTS

| | | | |
|---|---|---|---|
| 4,907,701 | 3/1990 | Kobayashi et al. | 209/576 |
| 5,335,790 | 8/1994 | Geiger et al. | 209/518 |
| 5,335,791 | 8/1994 | Eason | 209/588 |
| 5,398,818 | 3/1995 | McGarvey | 209/580 |
| 5,477,955 | 12/1995 | Madden et al. | 209/912 X |
| 5,497,887 | 3/1996 | Hiebert | 209/912 X |

FOREIGN PATENT DOCUMENTS

| | | |
|---|---|---|
| 0460849 A2 | 12/1991 | European Pat. Off. . |
| 2165942 | 4/1986 | United Kingdom . |
| 2259898 | 3/1993 | United Kingdom . |
| WO 95/04612 | 2/1995 | WIPO . |

*Primary Examiner*—David H. Bollinger
*Attorney, Agent, or Firm*—Wolf, Greenfield & Sacks, P.C.

[57] ABSTRACT

An apparatus for sorting from a group of different articles at least one batch of articles where members of the batch are either the same of have some unifying visual characteristic, said apparatus including: (a) a conveying means for transporting the articles along a predetermined path; (b) at least one vision recognition unit; (c) removal means for selectively removing those articles from the conveying means which have been recognised by the vision recognition unit as having the one or more predetermined visual characteristics.

16 Claims, 7 Drawing Sheets

6,149,016

AUTOMATED SORTING APPARATUS AND SYSTEM

BACKGROUND OF THE INVENTION

The present invention relates to an automatic sorting apparatus useful in sorting articles into batches such that the batched articles are the same or have some unifying characteristic or characteristics.

SUMMARY OF THE INVENTION

The present invention has application and is useful in sorting a range of different articles. Whilst there are various descriptions in this specification to the use of the apparatus of the invention for sorting specific items the invention is equally applicable to the sorting of other articles. One area where there is an increasing need for automated sorting is for articles which are intended to be recycled for further use in commerce. For example, glass bottles are commonly recycled and reused. When such bottles are originally manufactured, they are supplied in homogenous batches. However, after there has been supply and use by the consumer, the bottle becomes one of the heterogenous collection which includes a range of different bottle sizes and types. For the bottles to be commercially useful they need to be sorted back into homogenous groups so that they may be resupplied to an appropriate user. With the present day heavy emphasis on recycling, there are a number of examples of articles where such sorting is commercially important if the articles are to be conveniently re-used. Manual sorting is time consuming laborious and costly. The apparatus of the present invention is particularly suited to the sorting of articles such as garment hangers although it will be appreciated to those skilled in the art that the invention is by no means limited to its use in connection with such articles.

Garment hangers are produced by a number of different manufacturers in an extensive range of shapes, sizes and colors. Whilst individual plastic garment hangers are relatively cheap to make, major clothing manufacturers and retailers expend significant monies each year on the purchase of garment hangers for presentation of garments for sale. In recent times, it has been appreciated that even relatively light weight plastic hangers can be reused a number of times before they will fail. As a result, it has recently been recognized that if garment hangers are retained by retailers they may be resupplied to the clothing manufacturers for re-use. Once a retailer has sold a range of clothing items it is necessary to sort the retained hangers into groups in which each hanger is similar or the same type if they are to be suitable for re-supply. The applicant has for some time provided services for the re-sorting and recycling of garment hangers but heretofore, it has been necessary for this sorting to be done manually. The exercise is labor intensive and costly.

Thus, it is an object of the present invention to provide an automated system useful for sorting a group of different articles such as garment hangers into batches where the articles in the batches are either the same or have some unifying characteristic.

Thus, in accordance with a first aspect of the present invention there is provided an apparatus for sorting from a group of different articles at least one batch of articles where members of the batch are either the same or have some unifying visual characteristic, said apparatus including:

(a) a conveying means for transporting the articles along a predetermined path;

(b) at least one vision recognition unit;

(c) removal means for selectively removing those articles from the conveying means which have been recognized by the vision recognition unit as having the one or more predetermined visual characteristics.

Preferably, the apparatus is adapted to sort from a group of different articles two or more batches of articles where members of each batch are either the same or have some unifying visual characteristic.

In such a case, it is preferred that the apparatus include separate and dedicated removal means for each of the types of articles being removed from the conveying means. Each removal means is preferably associated with a collection bay at which the articles are maintained in respective sorted batches.

It is preferred that the one or more vision recognition units be associated with a processing means which is adapted to separately activate each of the respective removal means and that the processing means be further adapted to use information from the vision recognition unit so that each article identified by the vision recognition unit as being of a particular group is associated by the processing means with a particular removal means and that each one of the respective removal means be dedicated to removing articles having the same predetermined visual characteristics which are different from the predetermined visual characteristics of the articles to which one or more of the other respective removal means is dedicated. In this way, the plurality of removal means can selectively remove from the conveying means the articles in batches where each batch includes articles having one or more predetermined visual characteristics which are the same but are different from the predetermined visual characteristics of the articles in one or more of the other batches.

Most preferably, each of the respective removal means are located at different places along and adjacent to the predetermined path so that articles may be removed from the conveying means sequentially after being recognized by the vision recognition unit.

It is preferred that the articles be deposited onto the conveying means by an automatic loading apparatus and suitable apparatus for this purpose is described in the applicant's co-pending Australian patent application PN 8168. The applicant appreciates, however, that alternative automatic loaders are known and alternative automated systems for loading the articles onto the conveyor can be used with the invention of the present application.

Preferably, the predetermined path is a continuous path. In other words, the conveying means preferably moves in a loop whereby articles are sequentially loaded onto the conveying means, identified by the vision recognition unit and removed from the conveying means by the removal means into groups, each having one or more predetermined visual characteristics. Once the article has been removed from the conveying means, a new article may be loaded in its place. In this way, the apparatus can operate continuously.

The vision recognition unit may be of any type known in the art. Preferably, the unit operates by taking an image of the article and comparing that image against information stored in a memory, thus allowing the unit to identify the article and also to ensure that it conforms with the pre-recorded standard.

It is generally known that where vision recognition units are used, it is normally necessary for the article to be carefully aligned for the purpose of comparing the image of the article with a pre-recorded standard. This is particularly so if there are relatively small differences between the respective articles being sorted. When articles are processed on a conveyor system, it is often difficult to deposit the article onto the conveyor in a predetermined orientation in a manner such that it would be accurately aligned for the purposes of visual recognition. It is of course possible to provide shaped holders for each conveyed article but this is expensive.

Accordingly, in a most preferred embodiment of the invention, the apparatus further includes alignment means adapted to align the article once attached to the conveying means. Various preferred forms of alignment mechanisms are hereafter disclosed but it is most preferred that any such alignment system be adapted to accurately align the articles on the conveyor without stopping the conveyor. In a first embodiment, the alignment means includes an article transporter attached to the conveying means which is adapted to hold the article from one portion thereof so that the article is suspended from the article transporter and wherein retention means associated with the article transporter can move from an operative mode in which the article is firmly retained to the article transporter to an inoperative mode in which the article can suspend freely under the influence of gravity. In this arrangement, once the article has been loaded onto the conveying means, the retention means associated with the article transporter can be caused to move to an inoperative mode and the article being suspended from the article transporter will over a relatively short period settle into a position which for each article of its type will be consistent. The article retention means associated with the article transporter can be a magnet which is caused to turn on and off if the portion of the article held by the article transporter is metallic. Alternatively, the retention means can be mechanical and an example of such mechanical retention means is disclosed in the applicant's copending U.S. Ser. No. 09/068,803 which is incorporated herein by reference.

An alternative alignment mechanism may include a ramp where articles conveyed by the conveying means are suspended therefrom and are caused to contact a flat but inclined ramp such that forward movement of the articles by the conveying means over said ramp causes the alignment of the articles. Depending on the nature of the article, additional means may be utilized with such a ramp such as depending spring loaded arms or similar such mechanisms adapted to brush against the article as is being drawn up or along the ramp.

In one particular embodiment of the invention where such alignment means is used, the ramp is made from a transparent material and the articles once passing up the ramp and being conveyed thereover are identified by the vision recognition unit and preferably viewing the articles through the transparent ramp and whilst the articles are in correct alignment and in contact with the ramp.

In a further embodiment of the invention, an alignment mechanism (or other processing means) is associated with a turntable or other mechanism which allows the article alignment means or processing means to move in concert with the conveying means.

In accordance with this aspect of the invention there is provided an apparatus for sorting from a group of different articles at least one batch of articles where members of the batch are either the same or have some unifying visual characteristic, said apparatus including:

(a) a conveying means for transporting articles along a first predetermined path said path including a portion which is curved;

(b) at least one vision recognition unit;

(c) transport means for transporting article processing means along a curved second predetermined path which is substantially parallel to at least part of the curved portion of the first predetermined path;

(d) removal means for selectively removing articles from the conveying means which have been recognised by the vision recognition unit as having one or more predetermined visual characteristics;

wherein the transport means is adapted to move the article processing means in concert with an article being transported along the curved portion on the first predetermined path parallel to the second predetermined path such that there is substantially no relative movement of the article processing means relative to the article and wherein the vision recognition unit is adapted to individually identify articles transported along the first predetermined path and activate the removal means for removal from the conveying means of all articles identified by the vision recognition unit as having the one or more predetermined visual characteristics.

Preferably, the vision recognition unit is positioned adjacent to the outer side of the curved portion of the first predetermined path. The first predetermined path includes an inner side which has a radius of curvature smaller than the outer side of the said path.

In the preferred embodiment described above, the processing may include an alignment mechanism adapted to align the article into a predetermined orientation for accurate identification of the article by the vision recognition unit. As the alignment mechanism in this embodiment of the invention travels along a path which does not move relative to the article, it is possible to utilize a mechanism which manipulates the article over some time until it is correctly orientated for visual recognition and other possible processing. Alternatively, or in addition, the article processing means may include functions for treating or processing the article whilst it is moving with the convenience of no relative movement between the processing means and the article. The vision recognition unit may in some cases be desirably located so to be conveyed along the second or a third predetermined path again parallel to at least part of the curved portion of the first predetermined path. In this way, the vision recognition unit may record a sharp image of the article for proper identification.

Operating the conveying means along the first predetermined path so to include a portion which is curved, also gives rise to other advantages in some particular applications. For example, it is often necessary for articles to be spaced quite broadly apart if a vision recognition unit is to obtain a clear view of an article being transported past it whilst being conveyed along a straight line. Where higher rates of conveyance are desired or it is desirable to have articles spaced by a relatively short distance, the vision recognition step can become a significant limiting factor. The applicants have recognized that several advantages can be realized if the vision recognition unit is located adjacent to the outer side of the curved conveying path (i.e. the edge of greatest radius curvature). This is particularly so if the path forms an arc of a circle such as a semi circle.

Thus, in a further preferred embodiment of this invention, the predetermined path includes a portion which is curved and includes an inner side which has a radius of curvature smaller than an outer side of the said path and said vision recognition unit is positioned adjacent to the outer side of the curved portion of the predetermined path and is adapted to individually identify articles transported along the predetermined path and activate the removal means for removal from the conveying means of all articles identified by the vision recognition unit as having one or more predetermined visual characteristics.

It will be appreciated that when articles are transported along the curved portion of the predetermined path, the outer extremities of the articles on the inner side of the curved path will be closer together than the outer extremities of the articles on the outer side of the path when transported around this curved portion. This means that on the outer side of the curved portion of the predetermined path the vision recognition unit located adjacent thereto obtains a broader angle of view of the articles as they are conveyed past it than if the articles were moving along a straight conveying path. Therefore, articles may be conveyed past the vision recognition unit at a faster speed and may be spaced closer together than for a corresponding straight line system. In another preferred embodiment of the invention, the curved portion of the predetermined path is a portion where the inner and outer sides of the path have uniform radiuses of curvature. Most preferably the curved portion of the path is a portion of a circle (e.g. semi-circular).

Further benefits flow from the use of a curved path portion around which the conveying means may pass. For example, the conveying means can follow the edges of two or more round turntables so that the conveying means follows a path which is a continuous loop. It is often desirable to manipulate or process articles before they are ejected in sorted batches. For example, it may be desirable to remove labels from the articles. In the case of garment hangers, it may be desired to separately remove sizing indicators attached to the hangers. It is desirable that the automated mechanism move continuously if it is to maximize the processing rate. Further, in any system where the conveying mechanism is required to stop and start, there is a greater likelihood of malfunction due to jamming or the like. Thus, it is a further object of the present invention to provide a combined conveying and sorting system where articles may be manipulated and processed whilst continuously moving on the conveying means.

In its most preferred form, the apparatus sorts articles into a number of batches wherein each batch, each of the articles are substantially identical. In such case the predetermined visual characteristics are in each case those visual characteristics which distinguish a first type of article from those of all the others in the heterogeneous group. It is also preferred that the apparatus include supplementary removal means for removing all articles from the conveying means which do not have any of the predetermined visual characteristics required to activate any of the earlier article specific removal means.

In another embodiment of the invention, a continuous conveying means moves around a path which includes a portion of the circumference of a turntable adapted to rotate at the same speed as the conveying means. Preferably, the conveying means is supported at either end by respective turntables and the conveying means moves in a loop between the respective turntables. In these embodiments, article processing means is preferably located on one turntable. In this way, the conveying means will, in that portion where it is in contact with the turntable move along a curved path which is substantially parallel to the circumference of the turntable. Likewise, any point along the axis of the turntable passing through its center will also move along a path which is substantially parallel to the circumference of the wheel. If an article is connected or retained on the conveying means, the article will move along a path which is parallel to the circumference of the turntable and at the same radial rate. The same can be said for any point along an axis passing through the center of the turntable and a point on the circumference adjacent to the article on the conveying means. Thus, the article processing means may be permanently affixed to the turntable and move on rotation of the turntable at the same radial rate as an article on the conveying means such that there is no relative movement between the two over the portion where the conveying means is in contact with the circumference of the turntable. This provides a significant period of time during which the article may be manipulated and processed by the one or more article processing means whilst there is no relative movement between the article and the said one or more article processing means.

Depending on the size of the turntable utilized and the size of the articles intended to be sorted, it is possible to incorporate a number of different article processing mechanisms on the turntable. For example, if the apparatus is designed for use with garment hangers, the article processing means may include a sizing indicator removal mechanism and if necessary an alignment mechanism. It is possible to incorporate, for example, a number of alignment mechanisms located at different parts of the circumference of the turntable. It is desirable that the conveying means incorporate article holders which are precisely aligned with each such alignment mechanism on the turntable. In the same way it is preferred that the turntable incorporate a number of separate sizing indicator removal mechanisms which will be precisely aligned with the article holders when they move about the circumference of the turntable. In this way, a number of articles may be separately processed with relatively short spacings between articles on the conveying means.

For articles such as garment hangers, it is preferable for the hanger to be oriented so that its face is perpendicular to the tangent of the circumference of the turntable to which it is adjacent. In this way, the rate at which the hangers are sorted is enhanced. The applicants have found that with the vision recognition unit adjacent the outer side of the curved portion of the path of travel there is sufficient angle of view to the face of the respective hangers even when they are spaced together on the conveying means quite closely. Preferably each hanger is spaced apart from the other by between 150 and 180 mm and the conveyor moves at a rate of between 350 mm/sec and 550 mm/sec. Alternatively for some hanger shapes it may be preferable to orientate the hangers so that their faces are parallel with the tangent of the circumference of the turntable at that position of the turntable to which they are respectively adjacent. In this way, the vision recognition unit is more easily able to identify all of the relevant visual characteristics of the hangers for the purpose of properly activating the appropriate removal means. However, it is preferred for automated deposit and removal apparatus that the hanger be oriented transverse to the direction of the travel of the conveying means because of the shape of the hook on most garment hangers. Thus, it can be desirable that the conveying means include a holder for holding the article which is adapted to rotate. In one preferred embodiment the holder is adapted to rotate by incorporating a plurality of protrusions each adapted to co-operate with cams located adjacent to the conveying means. Alternative mechanisms known in the art may equally be used. In the case of garment hangers it is preferred that the article be collected with the face transverse to the direction of the first predetermined path. In those cases where it is desired to rotate the hanger by 90° so that the face of the garment hanger may be more readily identified by the vision recognition unit it is preferably thereafter rotated to its original orientation prior to removal. If there is sufficient space between articles being conveyed on the conveying means, then it is preferred to maintain the articles in the same orientation throughout the operation. This requires careful location of the vision recognition unit so to ensure that it has a broad enough view of the article to adequately identify it.

According to a further aspect of the present invention there is provided an apparatus for sorting from a group of different garment hangers at least one batch of hangers where each hanger of the batch has either the same or some unifying visual characteristic, said apparatus including:

(a) a conveying means for transporting garment hangers along a first predetermined path, said path including a portion which is curved;

(b) at least one vision recognition unit;

(c) transport means for transporting hanger processing means along a curved second predetermined path which is substantially parallel to at least part of the curved portion of the first predetermined path;

(d) removal means for selectively removing garment hangers having one or more predetermined visual characteristics from the conveying means;

wherein the transport means is adapted to move the hanger processing means in concert with a garment hanger being transported along the curved portion of the first predetermined path parallel to the second predetermined path such that there is substantially no relative movement of the hanger processing means relative to the garment hanger and wherein the vision recognition unit is adapted to individually identify the garment hangers transported along the first predetermined path and activate the removal means for removal from the conveying means of all garment hangers identified by the vision recognition unit as having the one or more predetermined visual characteristics.

Preferably, the hanger processing means includes a sizing indicator removal mechanism adapted to grip and remove a sizing indicator clipped on to the garment hanger.

Preferably, the hanger processing means may also include alignment means for correctly aligning the garment hanger to enhance visual identification by the vision recognition unit.

Most preferably, both the alignment mechanism and the sizing indicator removal mechanism are located on a turntable adapted to rotate at the same speed as the conveying means to which the garment hanger is attached. The vision recognition unit in this embodiment of the invention is most desirably located adjacent to the turntable and positioned so to take a visual image of the garment hanger after it has been conveyed to the side of the turntable. The vision recognition unit or units may be programmed to identify any relevant visual characteristic. Preferably, it or they are programmed to collect data with respect to the following characteristics:

(a) hanger type;

(b) whether the hanger is damaged;

(c) hanger colour;

(d) whether a sizing clip is present;

(e) whether a logo or sticker is present;

(f) the colour of the sizing clip where present;

(g) the number of the sizing clip where present.

Preferably the vision recognition unit (in conjunction with processing means) is adapted to activate (or deliberately not activate) the appropriate sizing indicator clip removal mechanism and to activate a sizing clip removal mechanism at a time when the clip is to be released so that the apparatus may be used to sort not only the hangers but also the sizing clips.

In this regard, it is preferred that the conveying means includes an article transporter which is adapted to hold in one position a hanger and in a second position a sizing clip once it has been removed by the sizing clip removal mechanism. When the sizing clip removal mechanism is located on a turntable it should be adapted to remove a sizing clip from a garment hanger and to thereafter deposit it on the article transporter holding the hanger from which the sizing clip has been removed whilst the article transporter is being conveyed around the turntable.

The vision recognition unit is programmed so to activate the appropriate removal means for removing the identified hanger from the conveying means. Preferably the removal means is adapted to remove the hanger from the conveying means and deposit it in a storage container. In a case where, for example, a collection of three different types of hanger are being sorted, the apparatus would normally incorporate four separate removal means for removal of hangers from the conveying means. The vision recognition unit would be programmed to activate the first removal mechanism for hanger type A, the second removal mechanism for hanger type B, the third removal mechanism for hanger type C and a fourth removal mechanism for any oddments or damaged hangers.

It will be clear to those skilled in the art that the vision recognition unit may also be programmed to collect additional information as required for administrative or accounting purposes such as the number of hangers loaded into any one container, the number of containers filled, the number of containers required to fill a particular order, the type of garment hangers in any particular container, the number of hangers processed over any particular period of time, breakage numbers and type, sizing indicator clips, etc. The apparatus provides a mechanism for providing total stock control.

BRIEF DESCRIPTION OF THE DRAWINGS

Some embodiments of the invention are hereinafter described with reference to the accompanying drawings in which.

DETAILED DESCRIPTION

Figure 1:
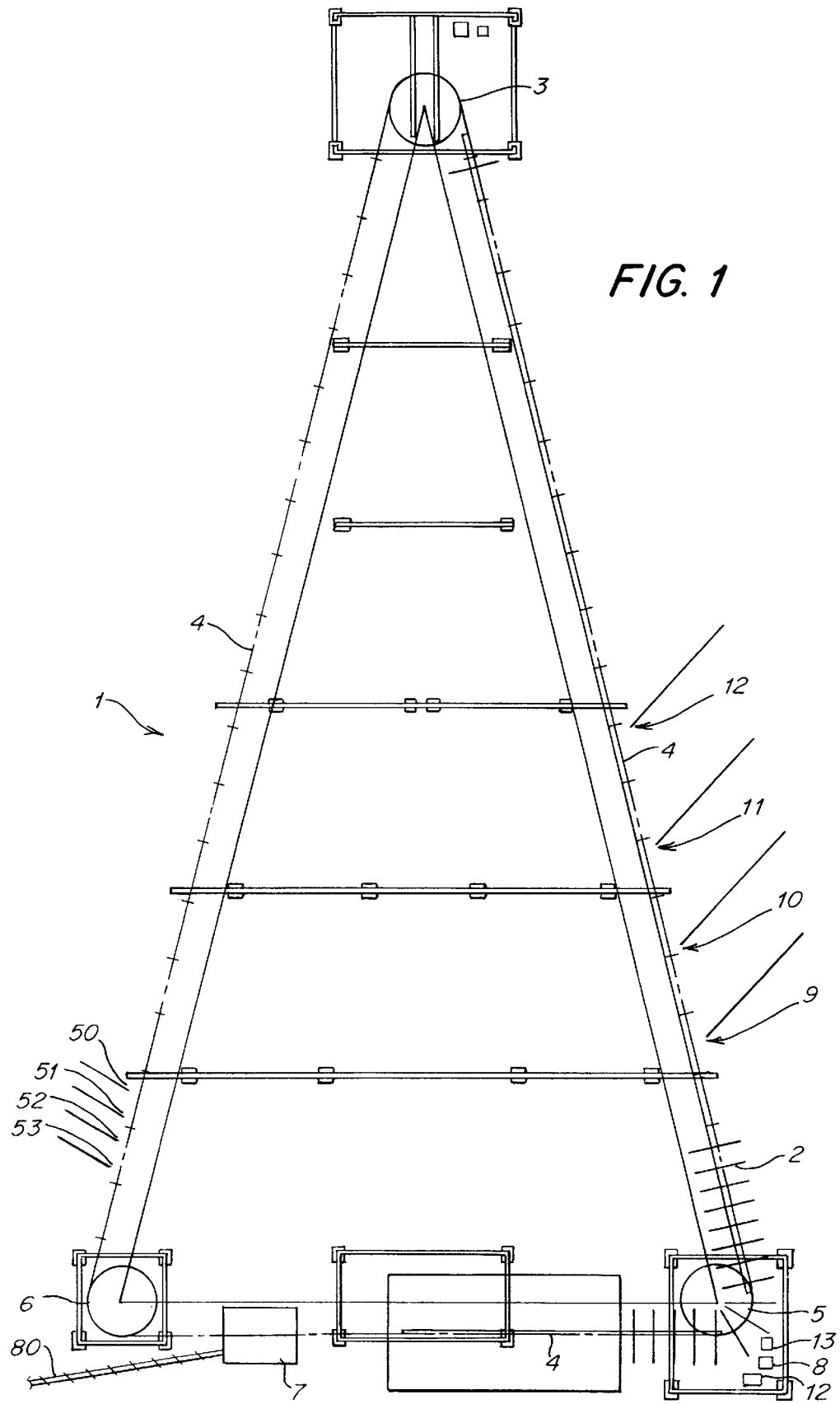
FIG. 1 is a plan view of an apparatus in accordance with the invention in which the conveying means travels in a loop around three separate turntables.

Referring first to FIG. 1, there is shown an apparatus generally designated by the numeral 1 for the sorting of garment hangers. In the embodiment shown, a container of unsorted hangers including four different types (Types W, X, Y & Z) are sorted by the apparatus into batches wherein in each batch the hangers are of the same type. Garment hangers 2 are shown in overhead outline adjacent turntable 5. Garment hangers 2 are transported around a first predetermined path 4 by a conveying means being a chain conveyor and article holder best seen by reference to FIG. 5. The sorting apparatus also includes turntables 3 and 6. Turntable 5 includes processing means and is shown in further detail in FIGS. 3, 4 and 5.

Figure 2:
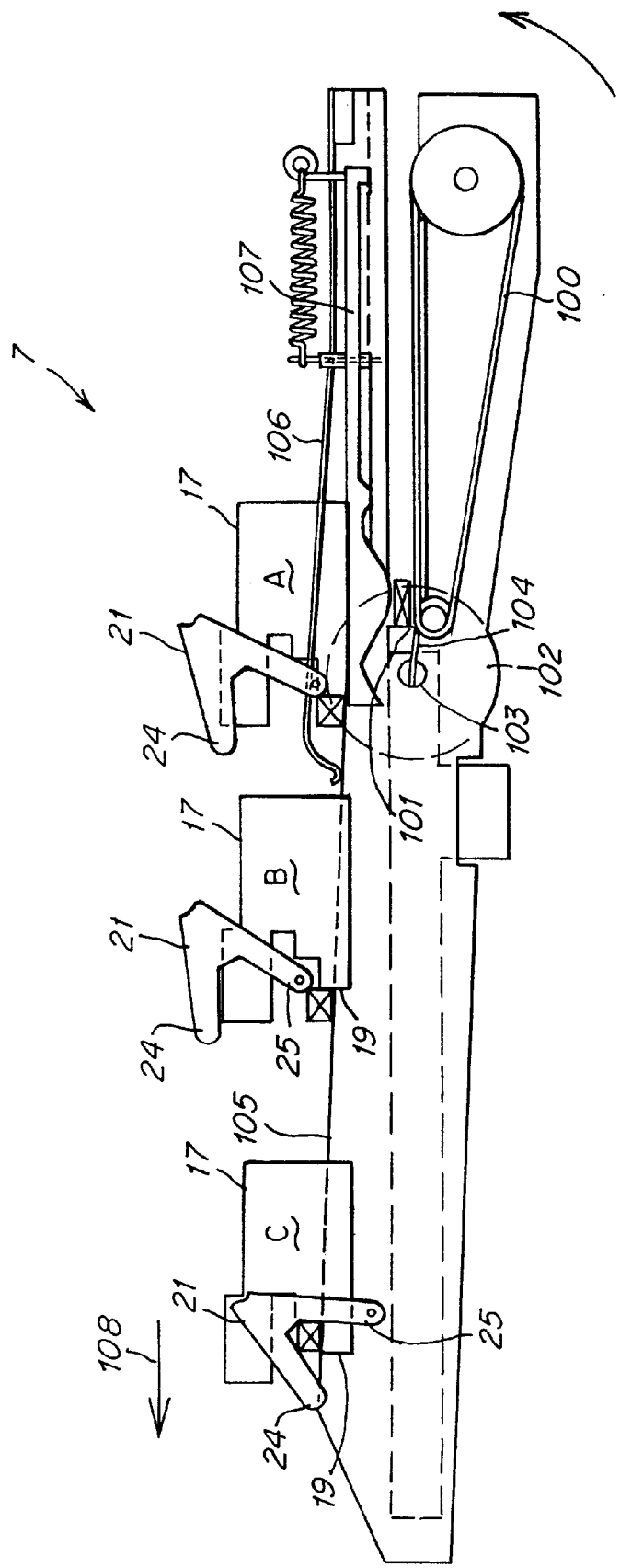
FIG. 2 is a side view of an automatic loader for loading articles onto the apparatus.

Preferably, the garment hangers are loaded onto the chain conveyor at location 7 by an automatic loader, an example of which is depicted in FIG. 2 and described in greater detail below. Alternatively, the hangers may be located on the chain conveyor manually. Once located on the chain conveyor, the garment hangers are sequentially conveyed to turntable 5 where the garment hangers are conveyed around a curved portion of the first predetermined path 4. At turntable 5, each individual garment hanger is identified by an adjacent vision recognition unit 8. Vision recognition unit 8 is located on the outer side of the curved portion of predetermined path 4.

Figure 4:
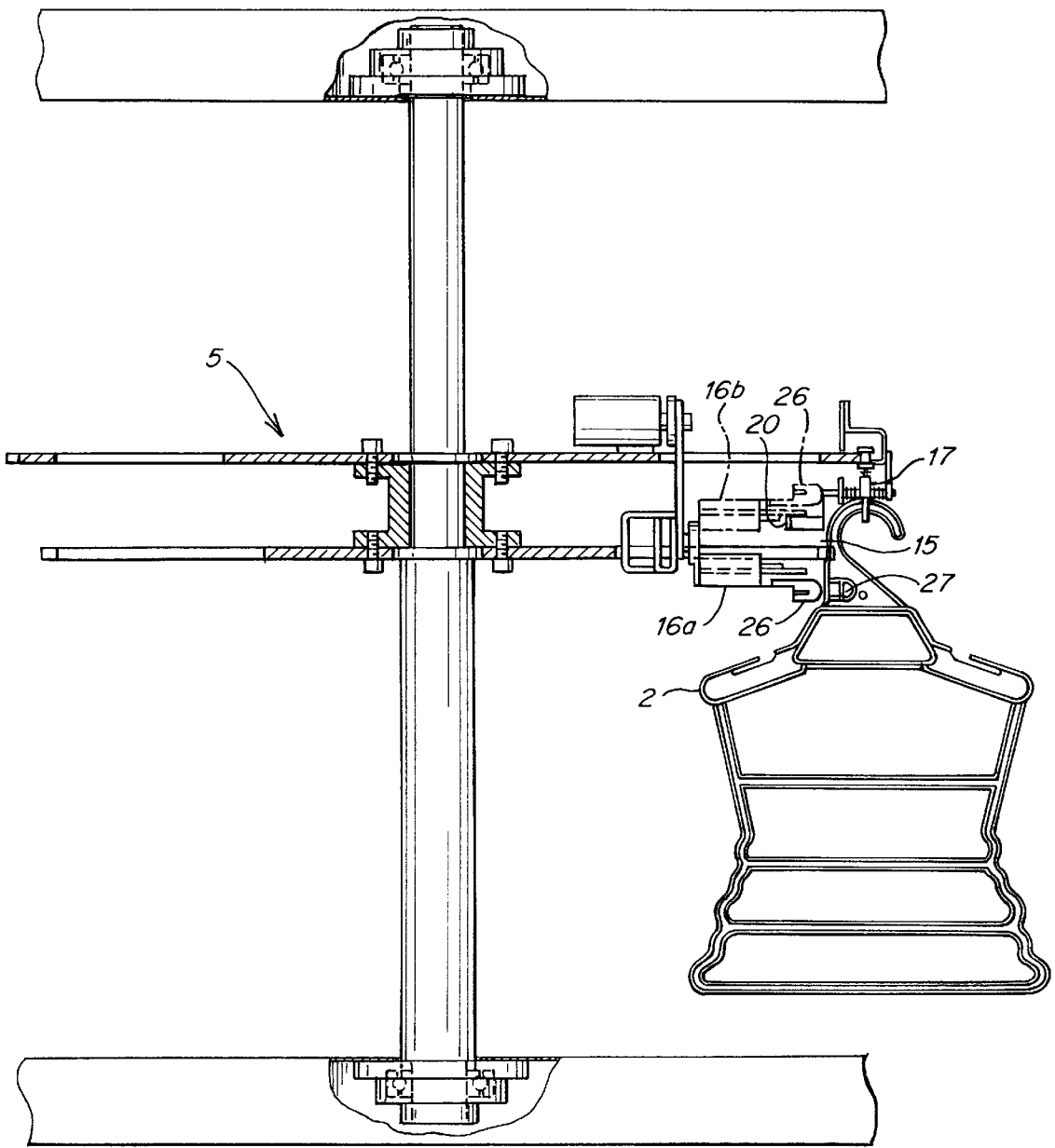
FIG. 4 is a cross sectional view of the turntable shown in FIG. 3 in which a garment hanger is shown in position whilst having a sizing indicator tab removed from a garment hanger by the processing means.

Removal means located at positions 9, 10, 11 and 12 are adapted to remove the hangers 2 from the chain conveyor. Each garment hanger is retained on an individual article holder as shown in FIG. 4. As each of the respective hangers pass by vision recognition unit 8, an image of the respective hangers is recorded and compared against information stored on a memory within processing means associated with the vision recognition unit 8 allowing the identification of the garment hanger as being either a type W, X, Y or Z (not shows) hanger. The vision recognition unit 8 has processing means so to match information concerning the type of hanger which has passed it with the specific article holder on which the hanger is retained. The system is coordinated such that the appropriate removal means designated for the particular hanger type, either 9, 10, 11 or 12 will be activated as the article holder comprising the identified hanger is conveyed to any one of these respective locations. For example, the removal means located at position 9 may be for the removal of type W hangers, the removal means at position 10 for the removal of type X hangers, the removal means at position 11 for the removal of type Y hangers and the removal means at position 12 for the removal of type Z hangers. If the vision recognition unit 8 should identify a type X hanger by reference to the comparison with the pre-recorded image of a type X hanger, then this information is matched against the particular article holder presently holding the hanger. If the hanger is identified as a type X hanger, then the vision recognition unit is programmed so to activate removal means at location 10 once the chain conveyor has conveyed this respective article holder and the hanger to location 10. When conveyed to location 10, the vision recognition unit activates the removal mechanism at that location so as to remove the type X hanger from the chain conveyor. The article holder once having had the garment hanger removed from it proceeds back to loading station 7 so to be loaded with a new hanger. Thus, the process is a continuous one around a closed loop. The apparatus also preferably includes a second vision recognition unit 13 used for identifying the color and the number on a sizing indicator clip located on the respective hangers for activation (or if desired non-activation) of a sizing indicator removal mechanism located on turntable 5. The sizing indicator clip removal mechanism is shown in more detail in FIGS. 4 and 5. Vision recognition unit 13 is adapted to identify the color and number on the sizing indicator clip located on each of the respective garment hangers as they pass by it and processing means associated with the vision recognition unit 13 coordinates the removal of the sizing indicator clip and its deposit into an appropriate receptacle. Preferably the apparatus includes separate receptacles at locations 50, 51, 52 and 53 for each of the expected different sizes and color of sizing indicators so that these are simultaneously sorted with the sorting of the hangers.

The garment hangers 2 are loaded onto the chain conveyor at location 7 preferably by an automatic loader as depicted in FIG. 2. The automatic loader includes a rod 80 having a screw thread or rib continuously extending in helical fashion along the rod. The rod is rotated in a direction such that the screw thread or rib rotates upwardly so that hangers located on the rod whilst it is circulating will move upwardly along the rod. Such a mechanism for transporting articles is previously known. Once the hangers reach the end of rotating rod 80, they are deposited onto a rotating belt 100. Preferably the belt provides adequate friction between the plastic garment hanger and the belt for the garment hanger to be moved in the direction of the belt rotation (shown by the arrow) once it is deposited there. In one preferment, an optical sensor is located adjacent to the belt 100 and is activated when more than five (or any other suitable number) hangers are located upon it. When this number of hangers are seated on the belt 100, the optical sensor can operate a switching mechanism to stop further rotation of the conveying rod. This prevents over stacking of garment hangers onto rotating belt 100. The belt continuously rotates so that the hangers positioned on it will firmly abut against end portion 101. Article holders 17 are separately conveyed along the first predetermined path past the automatic loader. The article holders 17 each include fingers 24 and 25 which are part of an operational arm 21 which is shown in full detail in FIG. 5. Indexing mechanism 102 is a rotating cylinder having an axis of rotation 103. Indexing mechanism 102 includes a lifting finger 104. As garment hangers reach end portion 101, the indexing mechanism is rotating about axis 103 and lifting finger 104 engages under the hook of the hanger and lifts it on to loading ramp 105. Loading ramp 105 is an inclined surface. Retaining leaf spring 106 prevents the garment hanger from being flicked too far forward by the lifting finger 104 and retaining arm 107 prevents the hanger from being thrown too high into the air. Once the garment hanger 2 has been lifted onto loading ramp 105, the passing article holders 17 (which are moving in the direction of arrow 108) come into contact with the hanger and move it forward. It will be appreciated from FIG. 2 that as the article holder 17 moves forward it pushes the garment hanger 2 along the loading ramp and up the incline of the loading ramp. The article holder includes a holding protrusion 19. In the position of the article holder marked A, the holding protrusion acts to push the garment hanger forward. Likewise it does this in the position marked B. By the time the article holder 17 has moved into the position marked C, it has been sufficiently elevated to be seated on holding protrusion 19. Simultaneously, due to the action of a cam (located above the operational arm 21), the operational arm 21 pivots through the positions illustrated at the locations A, B and C so that by the time it reaches position C fingers 24 and 25 firmly retain the garment hanger 2 on holding protrusion 19.

Whilst this preferred mechanism is used for loading the garment hangers onto the article holders 17, other methods, as would be appreciated by persons in the art, can be used. Indeed, it is possible to manually load garment hangers onto the article holder 17 without departing from the scope of the present invention. Once loaded onto the article holder, a chain conveyor conveys the garment hanger to turntable 5.

Figure 3:
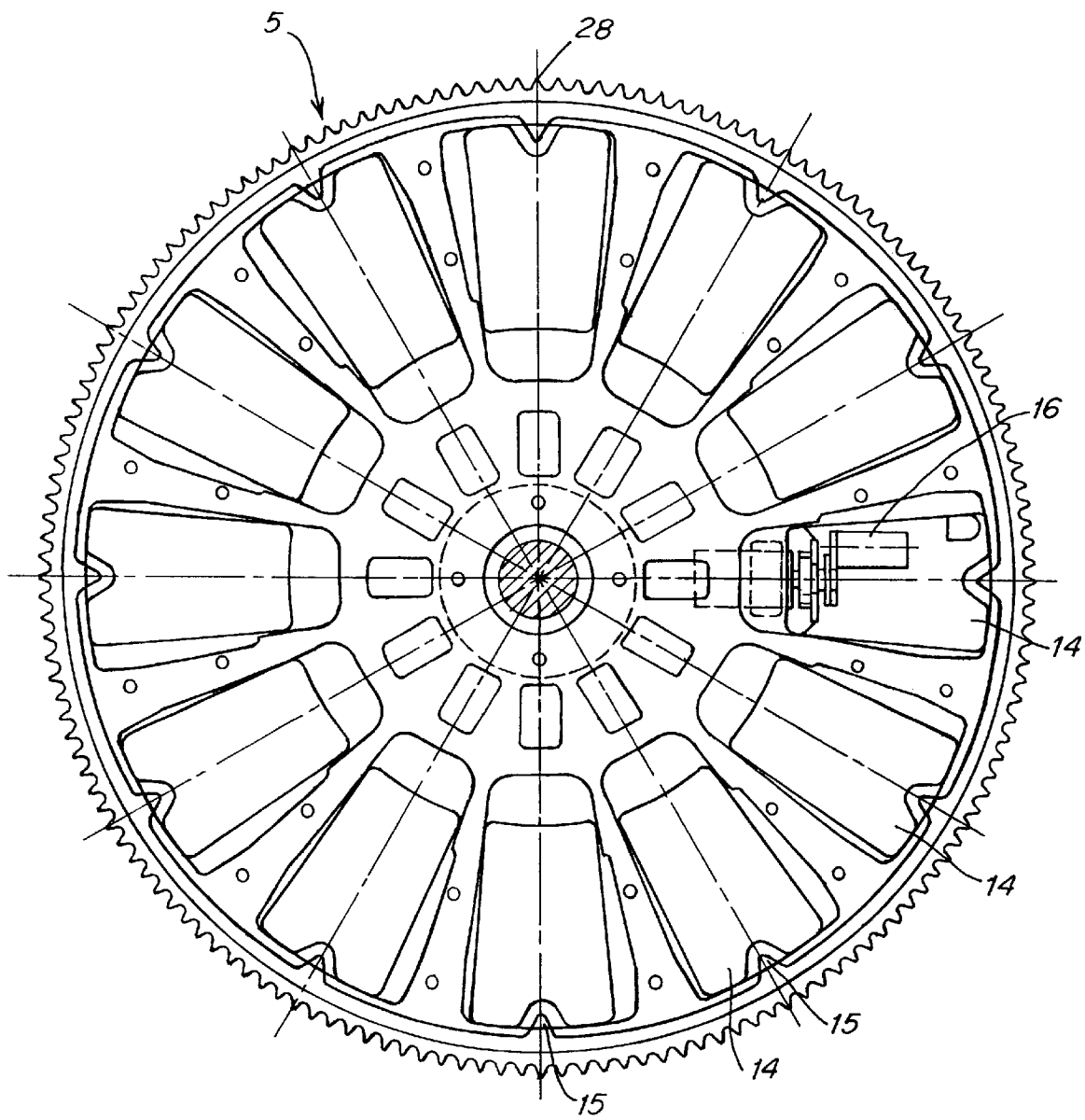
FIG. 3 is an underside view of a turntable used in the apparatus shown in FIG. 1 including processing means.

With reference to FIG. 3, there is illustrated in greater detail the underside of turntable 5. The turntable 5 includes a number of separate loading stations 14 (in the embodiment shown there are 12 such stations. However, it will be clear to those skilled in the art that this number may be modified). Garment hangers may be located adjacent to the loading stations when they reach turntable 5 on their conveyance about the apparatus. Each of the article holders on the chain conveyor are spaced by a distance equal to the distance between each of the loading stations 14 found on turntable 5.

Each loading station 14 includes a recess 15 shaped to accommodate the side of and to assist in the alignment of the respective hangers when they are moved into adjacent proximity to this portion of the turntable. This can be seen in side elevation in FIG. 4. A processing means, namely a sizing indicator removal mechanism 16 is associated with each loading station (for simplicity only one is shown in the figure). Thus there are 12 separate sizing indicator removal mechanisms 16 each operatively associated with and connected to turntable 5.

Figure 5:
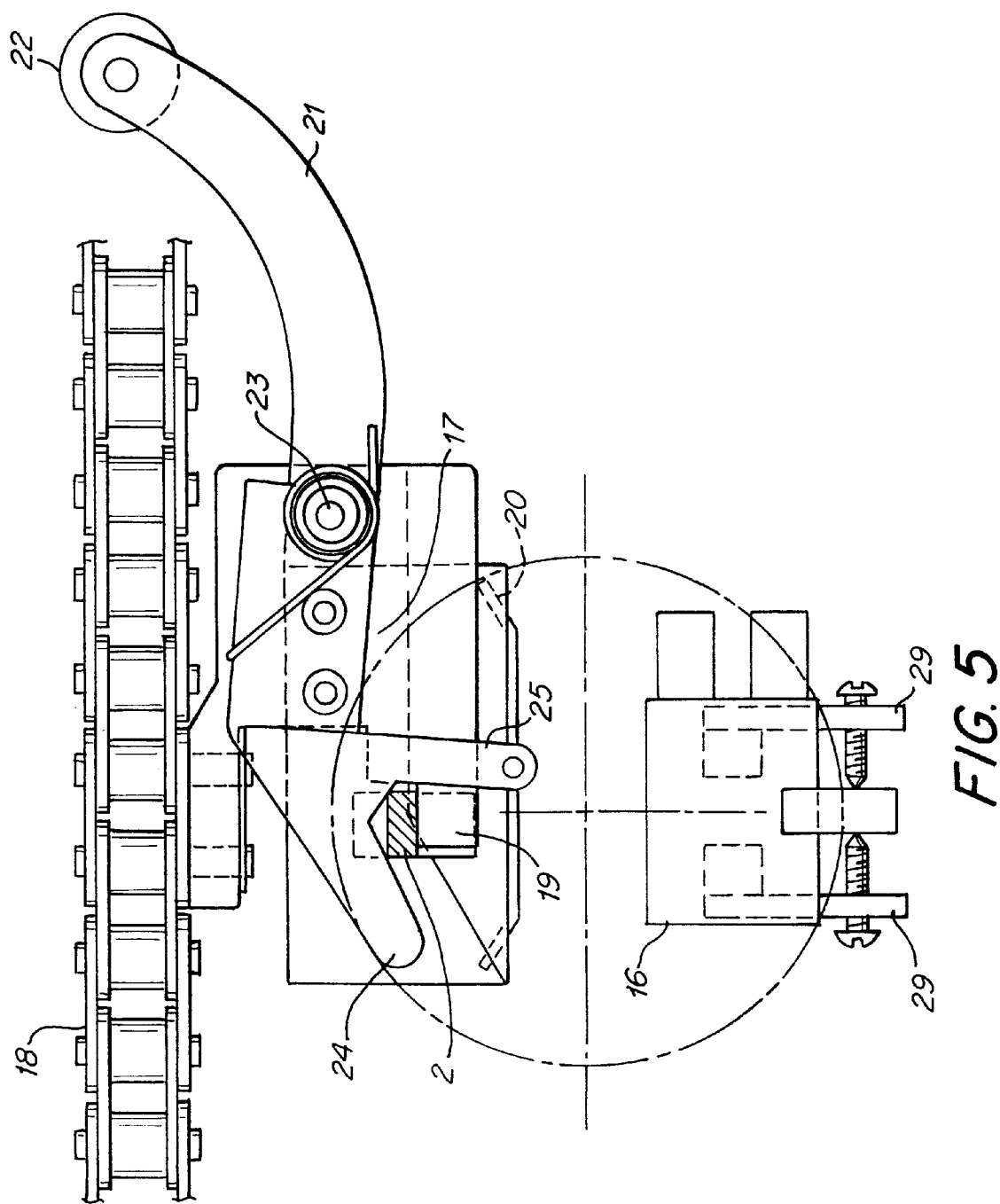
FIG. 5 is a cross sectional view of the conveying means when positioned adjacent to the turntable and in line with a sizing clip remover.

As can be seen in FIG. 4, a garment hanger 2 is conveyed to turntable 5 by an article transporter 17. Article transporter 17 is more easily understood by reference to FIG. 5. In FIG. 5, the article transporter 17 is shown attached to a chain conveyor 18. Chain conveyor 18 extends around each of turntables 3, 4 and 5 so to follow first predetermined path 4 (see FIG. 1). The article transporter 17 is fixedly attached to chain conveyor 18. The article transporter 17 includes a holding protrusion 19 onto which the hook of the garment hanger can be seated. On one side of the article transporter 17, there is provided a holding bucket 20. Holding bucket 20 is for retaining a removed sizing indicating clip once it has been removed as will be hereinafter described. On the other side of the article holder 17, there is provided an operational arm 21. At one end of operational arm 21 there is provided a wheel 22 adapted to run along the top of a channel (not shown) in which chain conveyor 18 moves. Operational arm 21 is fixed to the article transporter 17 at pivot point 23. At the other end of operational arm 21, there is provided two finger like protrusions 24 and 25. When a garment hanger is in position on holding protrusion 19 as is illustrated in FIG. 5, fingers 24 and 25 are located on either side of the hook of the garment hanger so to firmly hold it in position on holding protrusion 19. It will be appreciated that if the end of the operational arm 21 to which wheel 22 is connected is moved downwardly, the operational arm will pivot about pivot point 23 and fingers 24 and 25 will move upwardly causing hanger 2 (the hook of which is shown as a shaded portion) to be ejected off holding protrusion 19. The mechanism whereby this might be activated is discussed hereinafter.

Article transporters 17 are located on a chain conveyor 18 such that each of the respective article transporters will accurately align with each of the loading stations 14 on turntable 5 and so that a top portion of the hanger will be positioned and abut against indentation 15. In this position, and whilst the chain conveyor moves about turntable 5, the garment hanger 2 will be held firmly against turntable 5. In this fixed position it is easier to conduct various processing of the hanger which might be desired before it is removed from the chain conveyor 18. The location of the side of the hanger 2 against indentation 15 also provides support for the hanger whilst the sizing indicator clip 26 is removed.

In the embodiment shown, the garment hanger includes a sizing indicator clip 26. In FIG. 4, the sizing indicator clip 26 is shown after it has been removed from the hanger. However, the sizing indicator clip 26 is normally fitted within the garment hanger 2 in recess 27 as a clip fit.

As the chain conveyor conveys the article transporter 17 with the hanger attached thereto to turntable 5, it comes into engagement within indentation 15 of the loading station 14 at the point at which the chain conveyor 18 comes into first contact with the turntable 5. It will be appreciated that the next article holder on chain conveyor 18 will be positioned to locate against the next indentation 15 of the adjacent loading station 14 located on the turntable as the turntable continues to rotate and so on. Focussing on one particular garment hanger, once it reaches turntable 5 the turntable rotates past the vision recognition units 8 and 13 which identify the hanger type and the sizing indicator clip, color and number and if desired, other features such as an identity logo or design or if the hanger is damaged. Once the sizing indicator clip, color and number have been recorded for the specific article transporter concerned, the sizing indicator removal mechanism 16 is activated by a processor associated with the vision recognition unit to remove the sizing indicator clip 26 from garment hanger 2. Alternatively, it might be desired to deliver the hanger to a collection bay with the sizing indicator clip in position if the sizing indicator clip is of a particular color or size indication in combination with a particular type of hanger or some other combination of features such as identity logos appearing on the hangers. In this case, the processor associated with the vision recognition unit can be programmed so that the sizing indicator removal mechanism is not activated and the sizing indicator clip is not removed. In FIG. 4, the sizing indicator removal mechanism 16 is shown in both its lower most and upper most positions. At the lower most position designated 16a, gripping fingers 29 (best seen in FIG. 5) move forward and together to grasp the sizing indicator clip and the mechanism operates to withdraw the clip from the hanger. It then rotates through 180° to the position shown in FIG. 4 as 16b. At this position, the sizing indicator 26 is moved outwardly by the mechanism 16 so that it is located directly above bucket 20 whereupon it is released so that it is deposited into bucket 20. This operation is conducted on turntable 5 as the article holder 17 and the sizing indicator removal mechanism 16 move in concert whilst the article holder moves about turntable 5. There being no relative movement between the sizing indicator removal mechanism 16 and the garment hanger 2 during this process, there is ample time to safely remove the sizing indicator clip from the garment hanger and deposit it into the associated bucket 20 before the article holder moves away from the exit side 28 of turntable 5.

Once sizing indicator clip 26 has been deposited into the associated bucket 20, the garment hanger 2 and associated article transporter 17 are conveyed to where the various removal mechanisms 9, 10, 11 and 12 are located. The vision recognition unit 8 having identified the respective hanger activates the appropriate removal mechanism for the hanger concerned. The hanger 2 may be removed from the article transporter 17 by any process as is known in the art. In the particular embodiment shown, the processing means of vision recognition unit 8 activates the lowering of a cam (not shown) by a pneumatic or other equivalent system so to interact with the wheel end of operational arm 21 of article transporters 17. When the cam is activated and lowered into a position to interfere with wheel 22, this will cause the operational arm to pivot about pivot point 23 so causing the finger like protrusion 25 to move forward dislodging the hanger 2 from holding protrusion 19. Any suitable run off mechanism can be used so that the article hanger will be deposited into an appropriate container. It will be appreciated that the processing means of the vision recognition unit 8 will activate the appropriate removal means (either 9, 10, 11 or 12) depending on which hanger has been identified for the particular article holder concerned. In this way, the garment hangers are sorted into the appropriate homogenous, or if desired predetermined heterogeneous batches.

Vision recognition unit 13 may similarly activate respective removal mechanisms for the removal of the sizing indicator clips from bucket 20. Once again the processing means of vision recognition unit 13 may be adapted to activate the lowering of a removal mechanism such as a small brush at the appropriate point so to wipe the collected sizing indicator clip into a predetermined collection container. Vision recognition unit 13 and the associated processing means is adapted to activate one of a number of different removal mechanisms (shown at locations 50, 51, 52 and 53 in FIG. 1) equal to the number of different sizing indicator clips expected to be encountered for the articles placed onto the sorting apparatus.

In the embodiments of the invention shown in FIGS. 1 to 5, the vision recognition unit is located adjacent to one side of the turntable and the articles are aligned into correct orientation either before or whilst on the turntable.

Figure 6:
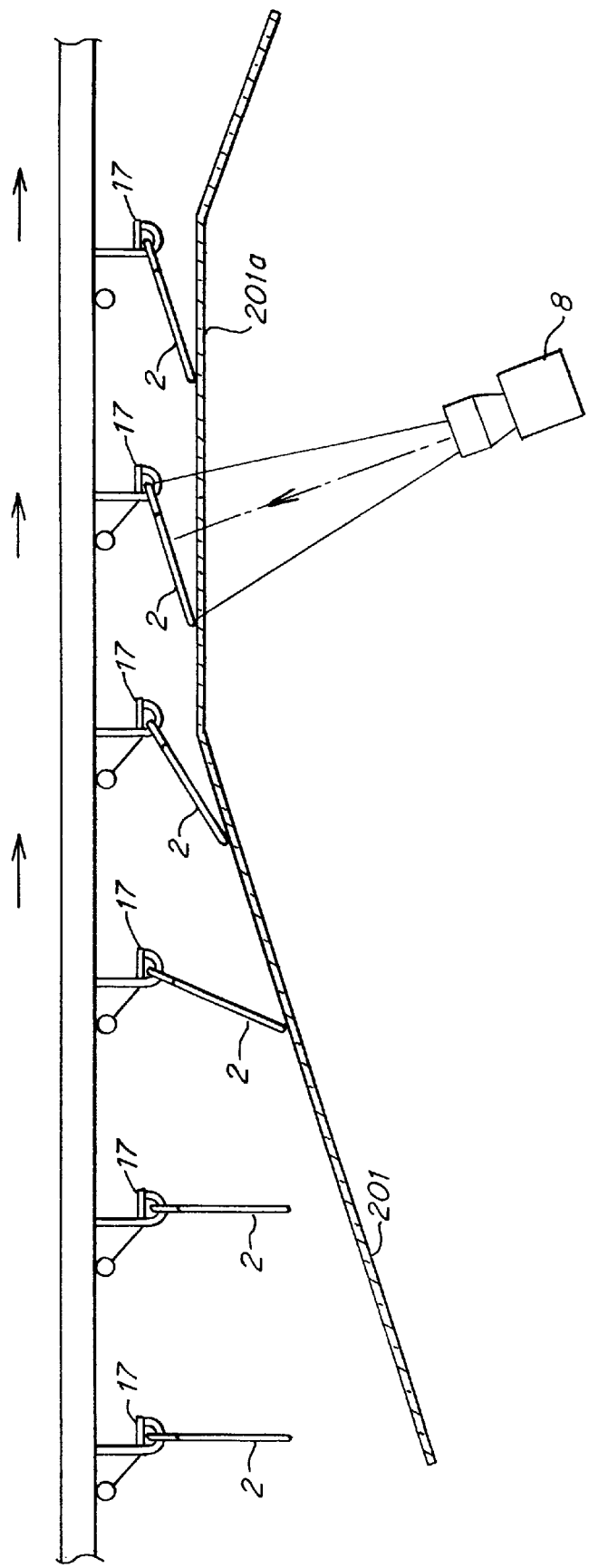
FIG. 6 is a cross sectional view of an alignment mechanism used in another embodiment of the invention.
Figure 7:
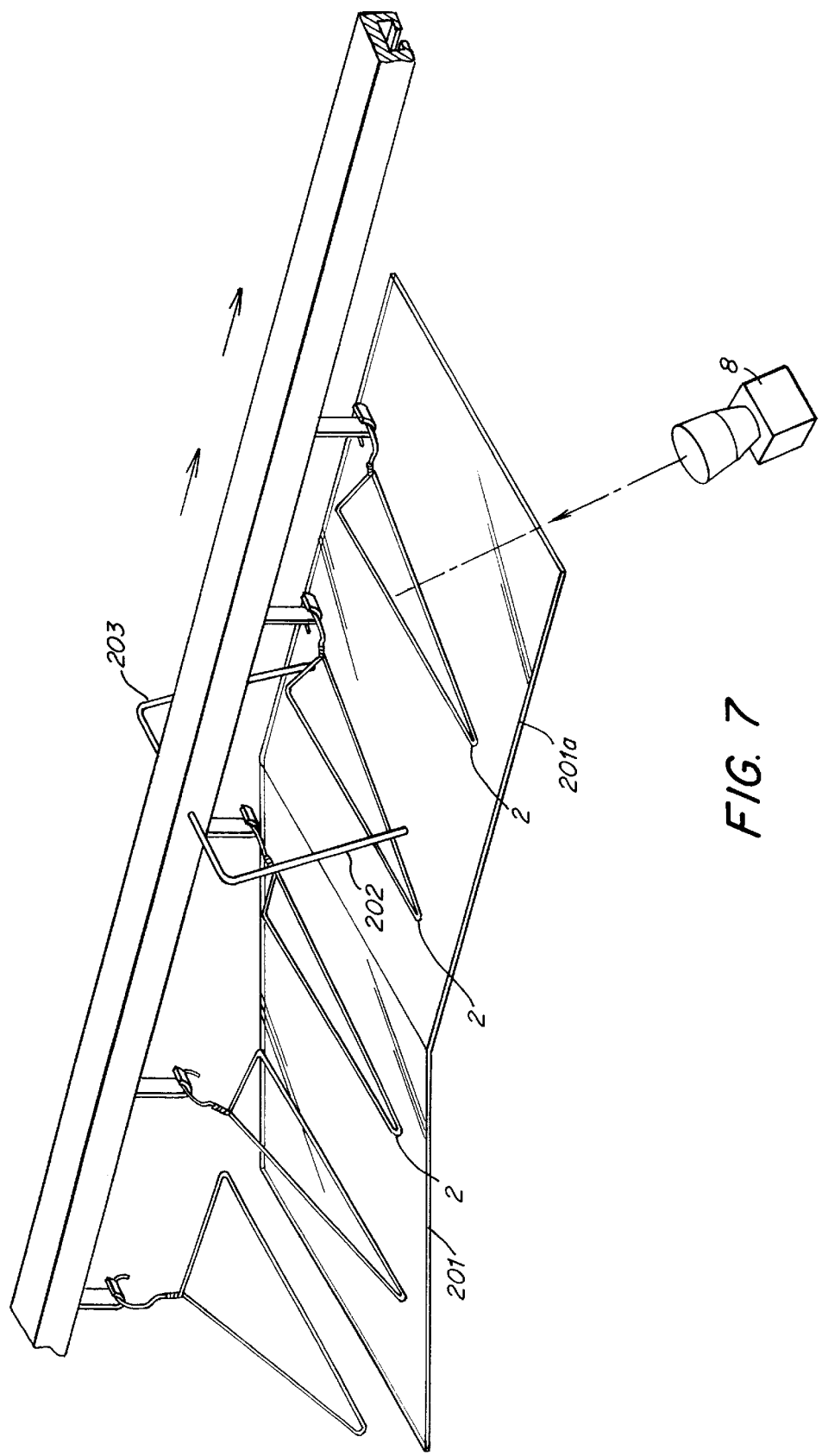
FIG. 7 is a perspective view of the alignment mechanism shown in FIG. 6.

For some articles, this method of vision recognition and alignment is not optimal and an alternative system of alignment and vision recognition is shown in FIGS. 6 and 7. This apparatus is particularly useful in aligning and identifying garment hangers which include a metal hook about which the arms of the hanger may rotate. For garment hangers which are formed integrally, the hook and the arms remain aligned with each other and the only area of alignment concern is whether the hanger is tilted such that one arm is higher than the other. With garment hangers where the arms may rotate relative to the hook, there are two areas of alignment concern, namely tilting (the same as for integral hangers) and rotation in the plane. The alignment mechanism shown in FIG. 6 includes a ramp 201 which is made from a transparent material and which is located beneath the conveying means. Garment hangers 2 are conveyed in the direction of the arrows and are connected to article transporters 17 which hold the hangers 2 in connected relation with the conveyor. The article transporters are adapted to hold the hangers 2 in a free form whereby they may move relative to the article transporter 17 whilst in contact with ramp 201. Preferably, the article transporter 17 is adapted to hold the hanger firmly once it is passed ramp 201 and is being conveyed to another location.

It can be seen in FIG. 6 that when hanger 2 comes into contact with ramp 201 (which is inclined) hanger 2 is caused to move into a position where it no longer suspends from article transporter 17 perpendicularly but is suspended at an angle. This causes planar alignment of hanger arms with the hanger hook. Ramp 201 includes a section 201a. As can be seen as the hanger is moved past this section of the ramp it is almost lying down and this provides a clear view through the transparent material of the ramp for vision recognition by vision recognition unit 8. Once the hanger is moved past this section of the ramp, it can thereafter swing into a position where it is suspended substantially vertically. With reference to FIG. 7, there is shown a pair of arms 202 and 203 positioned to brush past the tops of the arms of hangers 2 as they are being conveyed over ramp 201. Preferably arms 202 and 203 are spring loaded. This mechanism enables any tilting of the hangers to be corrected so that the hangers are aligned both in the plane and about the plane.

It will be appreciated that the alignment and vision recognition apparatus shown in FIGS. 6 and 7 can be used in the apparatus shown in FIG. 1 with any alignment and vision recognition apparatus being removed from the location of the turntable and located under any conventional part of the conveyor. Furthermore, this apparatus is suitable for use with hangers whether they be hangers with an integral hook or a separate hook about which the arms of the hanger can rotate.

Thus the present invention provides a convenient and automated system for the sorting and batching of various different articles into homogenous or selected heterogeneous groups. It has particular application for use with respect to garment hangers and the sorting of associated sizing indicator clips but the invention is of course not so limited. The apparatus disclosed herein simply requires one manual operator to load garment hangers onto the system. Thereafter, the hangers are identified, separately batched and sorted without any further manual assistance.

It will be appreciated that various modifications and/or improvements can be made to the apparatus hereinbefore described without departing from the spirit or ambit of the invention as claimed in the following claims.

What is claimed is:

1. An apparatus for sorting from a group of different articles at least one batch of articles where members of the batch are either the same or have one or more unifying visual characteristic, said apparatus including:

(a) a conveying means for transferring the articles along a predetermined path;

(b) alignment means adapted to align each of the articles in substantially the same orientation on the conveying means;

(c) at least one vision recognition unit for recognizing the articles which are the same or have the one or more unifying visual characteristic after being aligned by the alignment means; and (d) removal means for selectively removing the recognized articles from the conveying means.

2. The apparatus as claimed in claim 1 wherein the alignment means is adapted to align the articles on the conveying means without stopping the conveying means.

3. The apparatus as claimed in claim 1 wherein the alignment means includes an article transporter attached to the conveying means which is adapted to hold the article from one portion thereof so that the article is suspended from the article transporter and wherein retention means associated with the article transporter can move from an operative mode in which the article is firmly retained to the article transporter to an inoperative mode in which the article can suspend freely under the influence of gravity.

4. The apparatus as claimed in claim 1 wherein the alignment means includes a ramp and articles conveyed by the conveying means are suspended therefrom and are caused to contact and drag across the ramp such that forward movement of the articles over the ramp causes alignment of the articles.

5. The apparatus as claimed in claim 1 wherein the predetermined path includes a portion which is curved and includes an inner side which has a radius of curvature smaller than an outer side of the path and the at least one vision recognition unit is positioned adjacent to the outer side of the curved portion of the predetermined path and is adapted to individually identify articles transported along the predetermined path and activate the removal means for removal from the conveying means of all articles identified by the at least one vision recognition unit as being the same or having the one or more unifying visual characteristic.

6. An apparatus for sorting from a group of different articles at least one batch of articles where members of the batch are either the same or have one or more unifying visual characteristic, said apparatus including:
(a) conveying means for transporting articles along a first predetermined path, said path including a portion which is curved;
(b) at least one vision recognition unit;
(c) removal means for selectively removing articles from the conveying means which have been recognized by the at least one vision recognition unit as being the same or having the one or more unifying visual characteristic;
(d) article processing means for separately activating the removal means; and
(e) transport means for transporting the article processing means along a curved second predetermined path which is substantially parallel to at least part of the curved portion of the first predetermined path;
wherein the transport means is adapted to move the article processing means in concert with an article being transported along the curved portion on the first predetermined path parallel to the second predetermined path such that there is substantially no relative movement of the article processing means relative to the article and wherein the at least one vision recognition unit is adapted to individually identify articles transported along the first predetermined path and activate the removal means for removal from the conveying means of all articles identified by the at least one vision recognition unit as being the same or having the one or more unifying visual characteristic.

7. The apparatus as claimed in claim 6 wherein said at least one vision recognition unit is positioned adjacent to an outer side of the curved portion of the first predetermined path.

8. The apparatus as claimed in either one of claims 6 and 7 wherein the processing means includes an alignment mechanism adapted to align the article into a predetermined orientation for accurate identification of the article by the at least one vision recognition unit.

9. The apparatus as claimed in any one of claims 6 or 7 wherein the processing means includes additional functions for treating or processing the article whilst it is moving.

10. The apparatus as claimed in claim 6 wherein the first predetermined path includes an inner side which has a radius of curvature smaller than an outer side of the said path and said at least one vision recognition unit is positioned adjacent to the outer side of the curved portion of the first predetermined path and is adapted to individually identify articles transported along the first predetermined path and activate the removal means for removal from the conveying means of all articles identified by the at least one vision recognition unit as being the same or having the one or more unifying visual characteristic.

11. The apparatus as claimed in any one of claims 1 or 6 wherein the conveying means moves along a path which includes a portion which follows the circumference of a turntable rotating such that the circumference of the turntable moves at the same speed as the conveying means.

12. The apparatus as claimed in any one of claims 1 or 6 wherein said article is a garment hanger.

13. An apparatus for sorting from a group of different garment hangers at least one batch of hangers where each hanger of the batch has either the same or one or more unifying visual characteristic, said apparatus including:
(a) a conveying means for transporting garment hangers along a first predetermined path, said path including a portion which is curved;
(b) at least one vision recognition unit;
(c) removal means for selectively removing garment hangers from the conveying means which have been recognized by the at least one vision recognition unit as being the same or having the one or more unifying visual characteristic;
(d) hanger processing means for separately activating the removal means;
(e) transport means for transporting the hanger processing means along a curved second predetermined path which is substantially parallel to at least part of the curved portion of the first predetermined path;
wherein the transport means is adapted to move the hanger processing means in concert with a garment hanger being transported along the curved portion of the first predetermined path parallel to the second predetermined path such that there is substantially no relative movement of the hanger processing means relative to the garment hanger and wherein the at least one vision recognition unit is adapted to individually identify the garment hangers transported along the first predetermined path and activate the removal means for removal from the conveying means of all garment hangers identified by the at least one vision recognition unit as being the same or having the one or more unifying visual characteristic.

14. The apparatus as claimed in claim 13 wherein said hanger processing means includes a sizing indicator removal mechanism adapted to grip and remove a sizing indicator clipped onto the garment hanger.

15. The apparatus as claimed in claim 14 wherein said conveying means includes an article transporter which is adapted to hold in a first position a garment hanger and in a second position a sizing indicator and wherein the sizing indicator removal mechanism is adapted to deposit a sizing indicator removed from a garment hanger onto the article transporter holding the hanger from which the sizing indicator is removed.

16. The apparatus as claimed in clam 15 wherein the apparatus further includes a plurality of sizing indicator removal mechanisms adapted to remove from the article transporters sizing indicators deposited thereon and wherein the at least one vision recognition unit is adapted to individually identify the sizing indicators whilst on the garment hangers and to activate the respective sizing indicator removal mechanisms designated for different types of sizing indicators identified so to remove from the article transporters all sizing indicators identified by the at least one vision recognition unit as being of one or more particular types.

* * * * *